United States Patent [19]

Rose

[11] 3,747,078

[45] July 17, 1973

[54] COMPENSATION TECHNIQUE FOR VARIATIONS IN BIT LINE IMPEDANCE

[75] Inventor: Jonathan W. Rose, Saunderstown, R.I.

[73] Assignee: International Business Machines Corporation, Armonk, N.Y.

[22] Filed: June 28, 1972

[21] Appl. No.: 266,860

[52] U.S. Cl. ....... 340/173 R, 340/173 FF, 307/213, 340/174 AD

[51] Int. Cl. ........................ G11c 11/40, G11c 13/00

[58] Field of Search .................. 340/173 R, 173 FF, 340/174 AD; 307/213, 238, 279

[56] References Cited

UNITED STATES PATENTS

| | | | |
|---|---|---|---|
| 3,292,162 | 12/1966 | Chong | 340/174 AD |
| 3,585,399 | 6/1971 | Andrews | 340/174 AD |
| 3,588,846 | 7/1971 | Linton | 340/173 R |
| 3,706,078 | 12/1972 | Hilberg | 340/173 R |

*Primary Examiner*—Terrell W. Fears
*Attorney*—James E. Murray et al.

[57] ABSTRACT

This specification describes a compensation technique for use with storage cells coupled at different points along a resistive sense line to a common sense amplifier so that the position along the sense line effects the impedance between the storage cell and the sense amplifier. The compensation technique involves varying the impedance of a device for coupling and uncoupling the storage element of each cell to the bit line. Where the impedance between the storage cell and the sense amplifier is small the coupling device's impedance is made large and where the impedance between the device and the sensing circuits is large the device's impedance is made small. More particularly, the element coupling the cell to the line is a field effect transistor whose length is made longer and shorter to vary its impedance and thereby compensate for impedance differences along the sense line between the storage cell and the sense amplifier.

9 Claims, 3 Drawing Figures

COMPENSATION TECHNIQUE FOR VARIATIONS IN BIT LINE IMPEDANCE

BACKGROUND OF THE INVENTION

The present invention relates to monolithic memories and more particularly to the technique for compensating for variations in bit line impedance from cell to cell.

Storage cells, such as those shown in Linton et al. U.S. Pat. No. 3,588,846 are usually arranged on monolithic chips in arrays addressed by orthogonally oriented addressing lines, sometimes called word lines and bit lines. To simplify the fabrication of these lines so that there need only be one layer of metalization, it is desirable that one of the lines, either the bit or word line, be a diffused line, which is, a line that is formed by diffusing a low impedance path in the chip. For instance, in the case of the storage cell in the mentioned patent, the bit lines could be diffused into the monolithic chip while the word line would be a metal line passing over the bit lines, at right angles to the bit lines, on a passivation layer. Therefore, there is no problem of an intersecting line and, for this reason, double layer metalization or underpassing techniques do not have to be used to avoid shorting of the bit lines to the word lines.

The use of diffused bit lines does, however, introduce another problem. The comparatively high resistance per unit length of diffused lines causes large variations in the cell to sense amplifier resistance. A typical variation in resistances would be from zero ohms for a cell located on the sense line at the sense amplifier end of the line to several kilohms for a cell located at the opposite end of the line. This variation in resistance seen by the cells along a bit line effects cell performance. High bit line resistance reduces output current and increases access time. However, it does improve stability. Low bit line resistance allows higher current but reduces stability. Because of these effects, the variation in resistance from cell to cell makes it difficult to design a single cell which will meet the conflicting requirements of stability and high performance.

In accordance with the present invention this problem is overcome by varying the impedance of devices that couple and uncouple the cell from the bit line during addressing of the cell and are called input/output devices. In the case of the field effect transistor storage cell, in the mentioned Linton et al patent this variation in impedance is accomplished by varying the channel length of the field effect transistors that serve as the input/output devices. To provide ideal operating conditions each of the cells on a bit line would have an input/output device with a different impedance. However, a cruder matching of resistance may be desired, say, three variations in impedance along a bit line; a high resistance impedance for the input/output devices of the third of the cells closest to the sense amplifier, a lower impedance for the input/output devices for one third of the cells furtherest away from the sense amplifier and an intermediate resistance for the input/output devices for those storage cells located between the two extremes.

Therefore, it is an object of the present invention to provide an improved monolithic memory.

It is another object of the present invention to provide a monolithic memory with improved characteristics.

It is another object of the present invention to provide a monolithic memory which is less expensive and smaller.

DESCRIPTION OF THE DRAWINGS

These and other objects, features and advantages of the invention will be apparent from the following more particular description of the preferred embodiment of the invention as illustrated in the accompanying drawings, of which:

In FIG. 1 the storage cells 10, 12 and 14 are representative of all the cells arranged along bit lines 16 and 18. The storage cell 10 represents those storage cells that are located closest to the sense and drive circuits 20, while storage cell 14 represents those storage cells located furtherest away from the sense and drive circuits 20, and storage cell 12 represents those cells located between the two extremes. The resistance of the bit line seen by the cells will vary from zero ohms resistance for the cells in group 10 closest to the sense and drive circuits 20 to a much higher resistance for the cells in group 14 furtherest away from the sense and drive circuits 20. The extent of this variation will depend on the resistance 22 per unit length of lines 16 and 18. In the case of diffused lines, it is desirable to make the diffusions thin to cut down on chip area used by the line. When lines are thin, the resistance 22 per unit length of the lines is quite high giving an extreme variation in resistance from one end to the other of lines 16 and 18. For instance, at the end of the line most distant from the sense and drive circuit 20 the impedance will be in the order of several kilohms while adjacent to the sense and drive circuits the resistance will be zero ohms.

Figure 1:
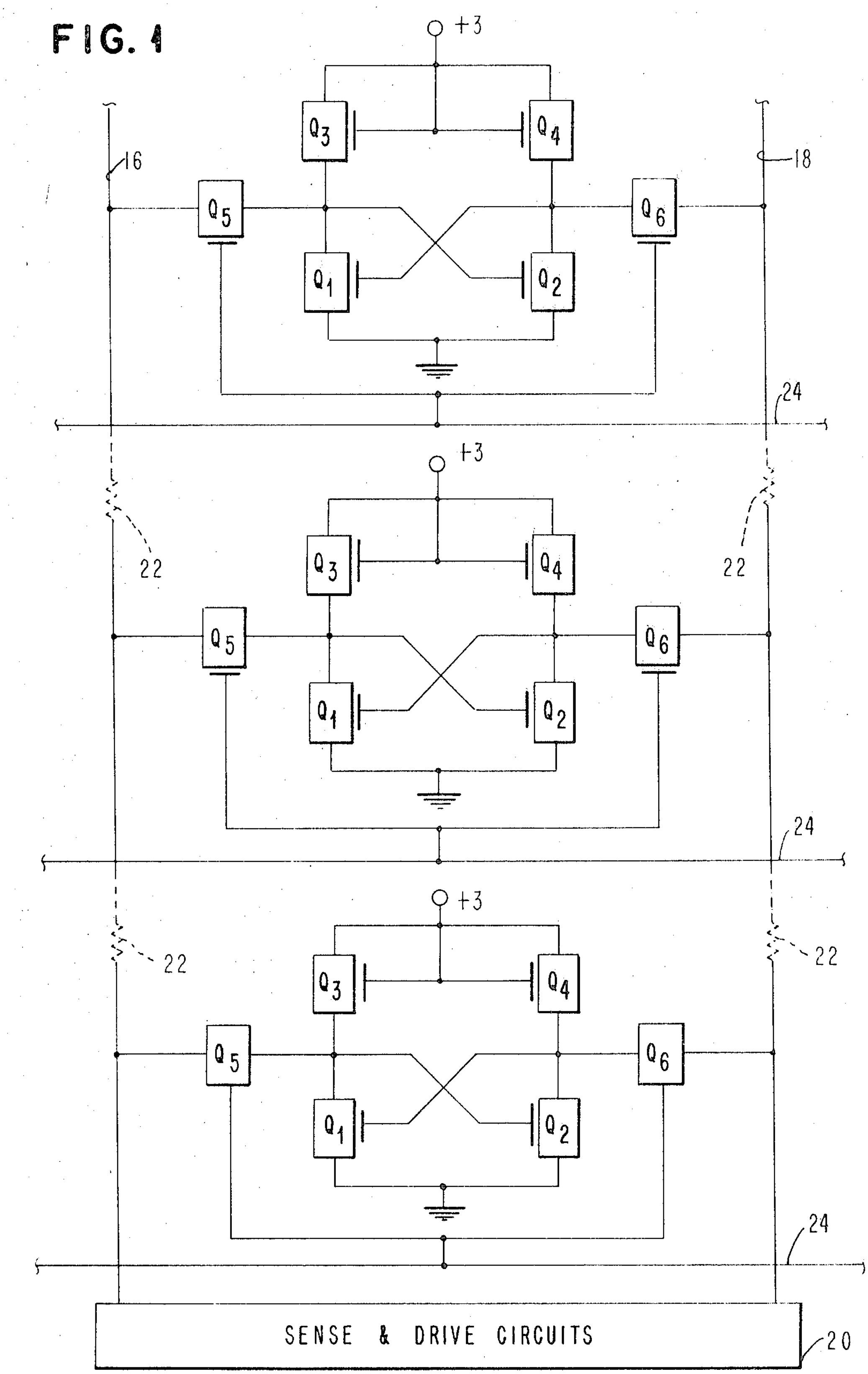
FIG. 1 is a schematic of a series of storage cells coupled to one set of bit lines.

This large variation in resistance makes it very difficult to design a cell which will be suitable for use at all possible positions along the sense lines. High bit line resistance reduces the output current from the cell and increases the access time of the cell. However, it does improve stability during a read operation. Low bit line resitance allows higher current but reduces stability. Therefore, if the same cell is employed for all positions along the bit line, the cells at the far end of the line will be slow and stable while the cells closest to the sense amplifier will be fast and unstable. In accordance with the present invention, the described problems are eliminated by varying the impedance of the input/output FET devices $Q_5$ and $Q_6$ from cell to cell so that the active or cross-connected devices for all the cells 10, 12 and 14 see substantially the same impedance when looking into the sense amplifier 20.

The cross-coupled FET devices $Q_1$ and $Q_2$ are connected to the grounded terminal of a 3-volt power supply while the drains of both the FET devices $Q_1$ and $Q_2$ are connected through separate load devices $Q_3$ and $Q_4$ to the positive terminal at this same power supply. Thus devices $Q_1$, $Q_2$, $Q_3$ and $Q_4$ constitute a bistable Schmidt trigger circuit in which devices $Q_1$ and $Q_2$ are the active cross-coupled devices of the trigger and the devices $Q_3$ and $Q_4$ are the loads for the active devices.

Information is stored in this bistable trigger circuit in the form of binary 1's and 0's. A binary 1 is stored in the circuit when device $Q_1$ is conducting and device $Q_2$ is off and a binary 0 is stored in the circuit when device $Q_2$ is conducting and device $Q_1$ is off.

For the purpose of reading or changing the information stored in the bistable trigger circuit, FET device $Q_5$ couples the trigger circuit to bit line 16 and FET device $Q_6$ couples the trigger circuit to the other bit line 18. The gates of the FET devices $Q_5$ and $Q_6$ are connected together and to the word line 24 for the cell so that the potentials at the gates of devices $Q_1$ and $Q_2$ can both be read upon application of a single read pulse to the word line 24.

As pointed out previously, the resistance of the bit lines effects the signals received from the cells by the sense circuit 20. To compensate for this, the channel length of FET devices $Q_5$ and $Q_6$ will vary from one end of the sense lines 16 and 18 to the other. The length of the channels in the cells 10 nearest the sense amplifier will be the longest and the channels in the cells 14 furtherest away from the sense amplifier will be the shortest while the width of the devices $Q_5$ and $Q_6$ remains the same in all cells. In this way the resistance between the sense circuit 20 and the trigger circuit comprising devices $Q_1$, $Q_2$, $Q_3$ and $Q_4$ will approximately be the same for all the storage cells and, therefore, compensate for the problem caused by the high impedance per unit length of the lines 16 and 18.

Figure 2:
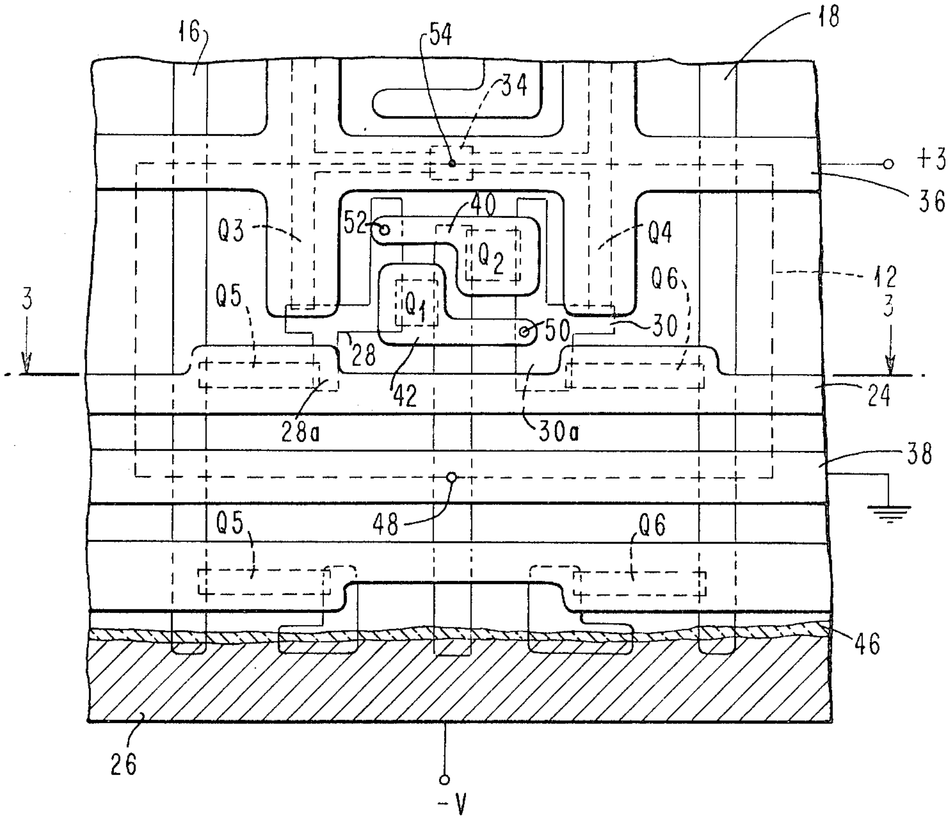
FIG. 2 is a plan view of the monolithic layout of one storage cell shown in FIG. 1.
Figure 3:
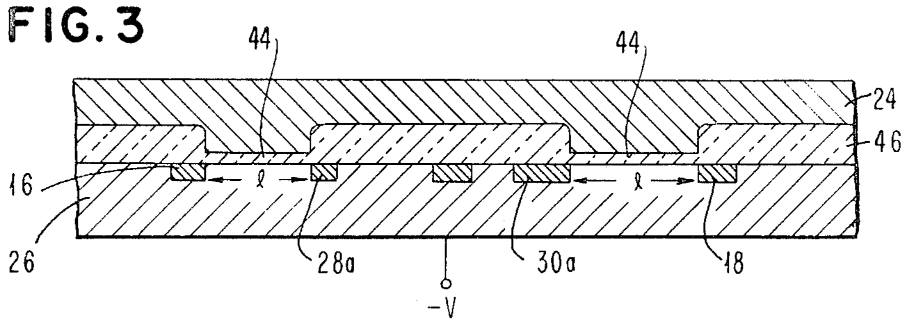
FIG. 3 is a section taken along line 3-3 in FIG. 2.

Referring now to FIGS. 2 and 3, it can be seen how the single cell 12 of the type described above can be fabricated to include the present invention. A substrate 26 of P-type material has a number of N-type diffusions placed in it. Long parallel diffusions 16 and 18 are the sense lines that are similarly numbered in FIG. 1. Between these two sense lines a number of diffusions 28, 30, 32 and 34 are made into the substrate to serve as source and rain diffusions for the devices $Q_1$ to $Q_6$. Partially overlying these diffusions are a number of metal areas 24, 36, 38, 40 and 42. These metalized areas form gates, interconnections, an addressing line, and a power supply line for the cells.

The dotted areas between the diffusions in the metalized areas represent the gates of the devices of the cells and are numbered $Q_1$ through $Q_6$ to show which device they represent in the schematic of FIG. 1. These gates are located over thin areas 44 in the silicon dioxide layer 46 that are made by etching the silicon dioxide layer and thereafter recoating the chip with silicon dioxide. The portion of the metal areas 24, 36, 38, 40 and 42 over the thin oxide areas then constitute the gates for the devices. The black spots 48 through 54 are metal contacts through layer 46 between the metalization stripes and the diffusions.

Thus, in the illustrated cell, the metalization line 24 constitutes the word line for the cell and the gate plates for devices $Q_5$ and $Q_6$ where the diffusions 16, 18, 28 and 30 represent the sources and drains for the devices $Q_5$ and $Q_6$. The impedance of devices $Q_5$ and $Q_6$ can be varied in accordance with the present invention by varying the distance L between the stripe diffusions 16 and 18 serving as the drains for devices $Q_5$ and $Q_6$,, respectively, and diffusions 28 and 30 serving as the sources for devices $Q_5$ and $Q_6$, respectively. The impedance is decreased by making the legs 28*a* and 30*a* thicker so that the distance L is shorter and the impedance is increased by making the legs 28*a* and 30*a* thinner to increase the distance L between those sections and the bit lines 16 and 18. The steps in which the distances can be varied is dependent on the needs of the system. In certain cases it may be desirable to have each cell connected to the bit lines 16 and 18 to have a different length so that the impedance for devices $Q_5$ and $Q_6$ in each cell would be different. In other cases only three or four different lengths L for devices $Q_5$ and $Q_6$ may be all that is necessary to satisfy the system requirements.

The ground connection for the cell is made to the source diffusions 32 for devices $Q_1$ and $Q_2$ through the metal stripe 38 and the metal contact 44 while a 3-volt connection to the cell is made to the drain diffusions and gates for devices $Q_3$ and $Q_4$ through the metalization stripe 36 and the contact 54. The cross-connections between the transistors $Q_1$ and $Q_2$ are made by the metalization sections 40 and 42 and contacts 50 and 52 which connect the drains of each of devices $Q_1$ and $Q_2$ to the gate of the other. It can be seen that $Q_3$ and $Q_4$ have quite elongated channels or gate areas. This is because they are very high resistance devices since they merely have to supply enough power to the cell to compensate for leakage. It is also noted that the metalized stripes 36 and 38 not only supply ground and power for the particular cell described, but also serve the same purpose for cells on either side of that cell. The stripe 36 serves as the power connection for the cell positioned above the cell just described while the stripe 38 serves as the ground connection for the cell below the one just described.

Therefore, while the invention has been shown and described with respect to the preferred embodiment thereof, it will be understood by those skilled in the art that various changes in form and detail may be made therein without departing from the spirit and scope of the invention.

What is claimed is:

1. In a memory having a plurality of storage cells coupled to a sensing circuit by a common sense line through a coupling device in each cell which is turned on to couple the particular storage cell to the sense line and turned off to uncouple the storage cell from the sense line, the improvement, comprising:

a gradation in impedance of the coupling devices along the sense line with devices of lowest impedance located furtherest from the sensing circuit along sense lines and devices of highest impedance located closest to the sensing circuit on the sense lines whereby variation in load impedances for the cell due to the sense line impedance is compensated for.

2. The memory of claim 1 wherein said coupling devices are field effect transistors which increase in channel length along the sense line as they approach the sensing circuit.

3. The memory of claim 2 wherein the impedance of the coupling device is different for each cell in the memory and the cell on the sense line.

4. The memory of claim 2 wherein the groups of adjacent cells have coupling devices with the same impedance.

5. In a memory having a plurality of storage cells coupled to a sensing circuit by a common sense line through a coupling device in each cell which is turned on to couple the storage cell to the sense line and turned off to uncouple the storage cell from the sense line, a method of improving the memory performance, comprising:

varying the impedance of the coupling devices inversely with the length of the sense line so as to compensate for the variation in output impedance caused by the resistance per unit length of the sense line.

6. The method of claim 5 including making the impedance of the output device different for each cell on the sense line.

7. The memory of claim 5 including making the groups of adjacent cells to have output devices with the same impedance.

8. A monolithic memory having a plurality of field effect transistor storage cells arranged on a monolithic chip of one type and being addressed through word lines and a bit line pair, comprising:

two spaced strips of the other type in the monolithic chip for serving as the bit line pair;

sensing means coupled to one end of said two spaced stripes;

a plurality of storage means positioned between the two spaced stripes at various locations along the two spaced stripes so that there is a storage means for each of the storage cells addressed by two spaced stripes;

a plurality of metal lines passing over the spaced stripes at right angles to the spaced stripes and electrically insulated from the spaced stripes so that each metal line functions as the word line for addressing each cell along said spaced stripes; and a pair of zones of said other type electrically connected to each of said storage means and partially positioned under one of said metal lines so as to form two field effect transistors each coupling one of the spaced stripes to the storage means where each of the spaced stripes serves as a terminal of one of said field effect transistors, each of said pair of zones serves as the other terminal of one of said field effect devices and said metal line passing over the zones serves as the gate of the field effect transistor, said spaced pair of zones being positioned further away from the stripes in the cells located closer to said one end of said two spaced stripes whereby cell to cell output impedance variations are compensated for.

9. The monolithic memory of claim 8 wherein said zones become smaller as they approach said one end to obtain the change in distance between the stripes and zones.

* * * * *